(12) United States Patent
Juel

(10) Patent No.: US 9,527,439 B2
(45) Date of Patent: Dec. 27, 2016

(54) MULTI-FREQUENCY ALARM FOR EMITTING NARROW BAND NOISE

(71) Applicant: Electronic Controls Company, Boise, ID (US)

(72) Inventor: Grant Juel, Boise, ID (US)

(73) Assignee: Electronic Controls Company, Boise, ID (US)

( * ) Notice: Subject to any disclaimer, the term of this patent is extended or adjusted under 35 U.S.C. 154(b) by 0 days.

(21) Appl. No.: 14/426,639

(22) PCT Filed: Sep. 10, 2013

(86) PCT No.: PCT/US2013/058906
§ 371 (c)(1),
(2) Date: Mar. 6, 2015

(87) PCT Pub. No.: WO2014/040021
PCT Pub. Date: Mar. 13, 2014

(65) Prior Publication Data
US 2015/0246638 A1    Sep. 3, 2015

Related U.S. Application Data

(60) Provisional application No. 61/699,055, filed on Sep. 10, 2012.

(51) Int. Cl.
*B60Q 5/00* (2006.01)
*B06B 1/02* (2006.01)
(Continued)

(52) U.S. Cl.
CPC ............. *B60Q 5/006* (2013.01); *B06B 1/0269* (2013.01); *G08B 3/10* (2013.01); *G08G 1/005* (2013.01); *G10K 9/12* (2013.01); *B60Q 5/00* (2013.01)

(58) Field of Classification Search
CPC ........... B60Q 5/006; B60Q 5/008; B60Q 5/00; H04R 2499/13; B06B 1/0269; G08B 3/10; G10K 9/12; G08G 1/005
(Continued)

(56) References Cited

U.S. PATENT DOCUMENTS 5,012,221 A    4/1991   Neuhaus et al.
6,201,470 B1   3/2001   Withington
(Continued)

FOREIGN PATENT DOCUMENTS

EP    1289798 B2    3/2003
WO    2007012806 A1   2/2007

OTHER PUBLICATIONS

Brigade Electronics PLC, "Broadband Sound—The safer and noise-less* back-up alarm", http://brigade-electronics.com/uploads/related_downloads/whitepaper_UK.pdf, 2009, 16 pages.
(Continued)

*Primary Examiner* — Thomas Mullen
(74) *Attorney, Agent, or Firm* — Stoel Rives LLP

(57) ABSTRACT

A multi-frequency alarm (10) generates a narrow band noise (MFA-87, -97, 102, -107) warning of a presence of a vehicle. The alarm includes noise signal circuitry (30) generating a pseudorandom bit stream to produce a noise signal that exhibits a multi-frequency spectrum; an active low-pass filter (40) receiving the noise signal and producing a narrow band noise signal, the active low-pass filter configured to establish for the narrow band noise signal spectral characteristics exhibiting a high-frequency noise signal magnitude roll-off that attenuates frequencies greater than 4 kHz; an audio amplifier (50) producing an amplified narrow band noise signal; and an audio speaker (60) responsive to the
(Continued)

amplified narrow band noise signal and configured to emit narrow band noise sound derived from the narrow band noise signal.

10 Claims, 7 Drawing Sheets

(51) Int. Cl.
 *G08B 3/10* (2006.01)
 *G10K 9/12* (2006.01)
 *G08G 1/005* (2006.01)

(58) Field of Classification Search
 USPC .................. 340/463, 384.7; 381/86, 98, 120
 See application file for complete search history.

(56) References Cited

U.S. PATENT DOCUMENTS 6,885,295 B2 † 4/2005 Hanson-Abbott
2006/0017579 A1 † 1/2006 Albert
2007/0146123 A1 † 6/2007 Hessing

OTHER PUBLICATIONS

Electric Druid Noise Generator—Datasheet, [online], Retrieved from the Internet: <URL: www.electricdruid.net/index.php?page=projects.noisegen>, last visited on Jun. 21, 2016, 4 pages.

Hebrank et al., "Spectral cues used in the localization of sound sources on the median plane," J. Acoust. Soc. Am., vol. 56, No. 6, pp. 1829-1834, Dec. 1974.

Macpherson et al., "Vertical-plane sound localization with distorted spectral cues," Hear Res., pp. 1-40, Dec. 2013.

Grothe et al., "Mechanisms of Sound Localization in Mammals," Physiol Rev 90:983-1012, 2010.

H. Nelisse, C. Laroche, C. Giguere, J. Boutin, V. Vaillancourt, P. Laferriere, Comparison of different vehicle backup-alarm types with regards to worker safety, Proceedings of the Institute of Acoustics vol. 33 Pt. 3, 10th International Congress on Noise as a Public Health Problem 2011 ICBEN 2011, held Jul. 24-28, 2011, London, UK, published by Institute of Acoustics, pp. 279-286.†

† cited by third party

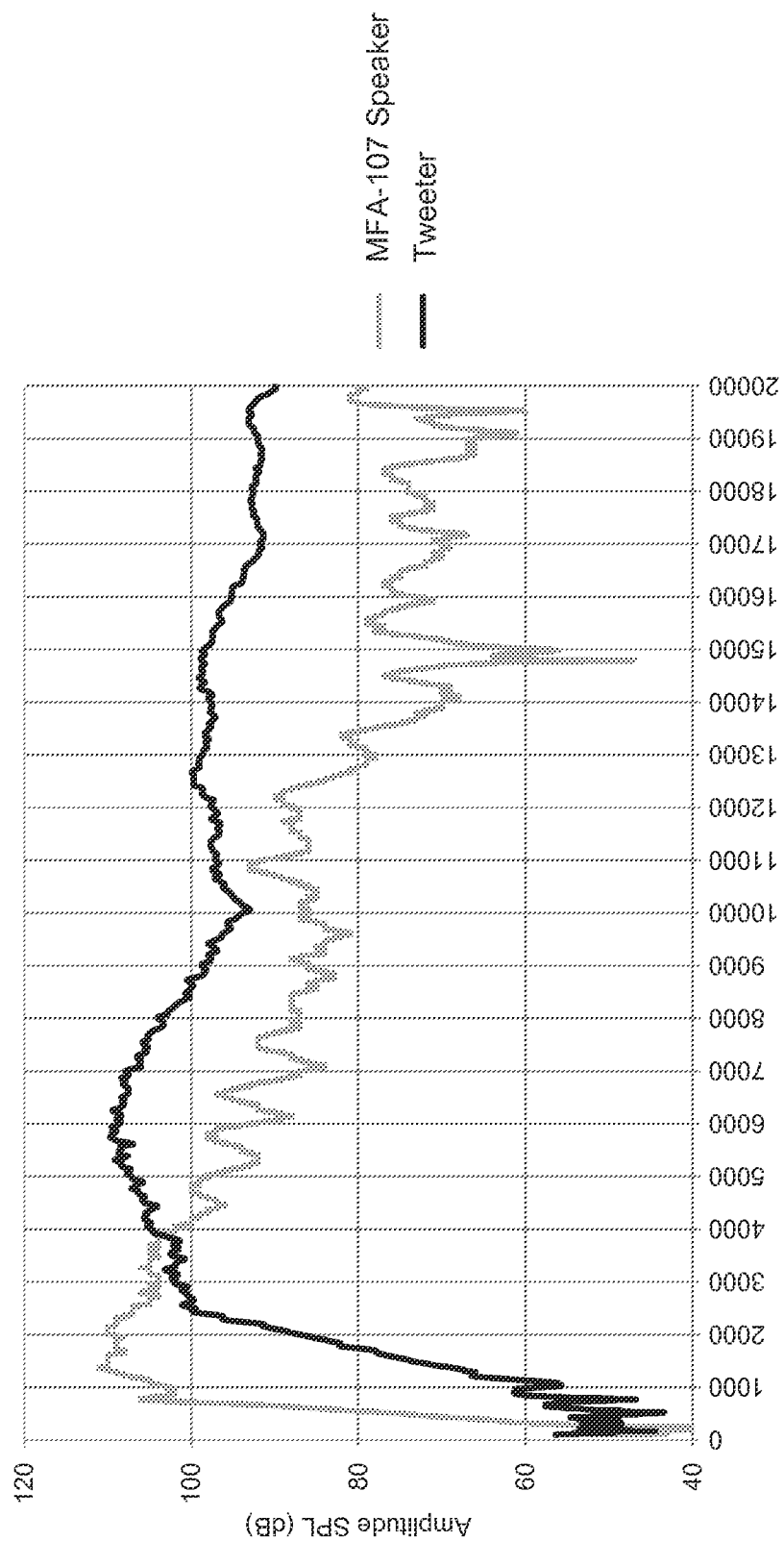

MULTI-FREQUENCY ALARM FOR EMITTING NARROW BAND NOISE

RELATED APPLICATION

This application claims priority benefit of U.S. Provisional Patent Application No. 61/699,055, filed Sep. 10, 2012, which is incorporated by reference herein in its entirety.

COPYRIGHT NOTICE

©2013 Electronic Controls Company. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This disclosure relates generally to vehicle alarms that warn people of a presence of a vehicle and, more particularly, to vehicle alarms emitting narrow band noise indicating a vehicle changing its position.

BACKGROUND INFORMATION

Previous vehicle alarm attempts, including back-up alarms that indicate vehicles are driving in reverse, have included pure-tone sound sources for predominantly emitting a fundamental frequency, and broad band noise sources for emitting broad band (white) noise encompassing a majority of frequencies in the range of human hearing.

SUMMARY OF THE DISCLOSURE

A multi-frequency alarm emits a narrow band noise sound having spectral characteristics exhibiting, at about a cutoff frequency of 4 kHz, appreciable attenuation of frequencies above 4 kHz, according to one embodiment.

Additional aspects and advantages will be apparent from the following detailed description of preferred embodiments, which proceeds with reference to the accompanying drawings.

BRIEF DESCRIPTION OF THE DRAWINGS

FIG. 6 is a graph showing SPL output of, respectively, a tweeter of conventional type and an audio speaker of the MFA-107.

DETAILED DESCRIPTION OF EMBODIMENTS

Figure 1A:
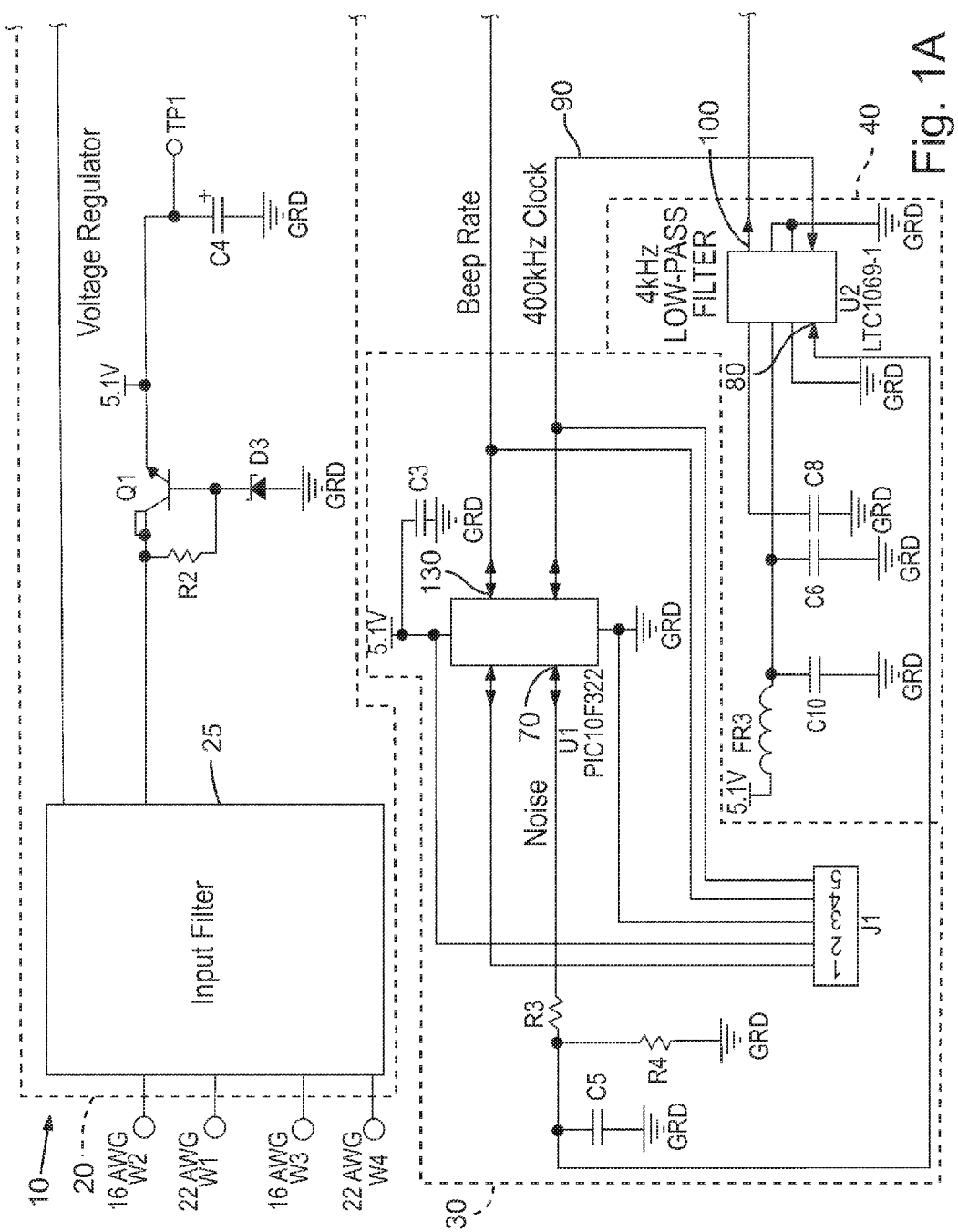
FIGS. 1A and 1B represent an electrical circuit schematic diagram of a narrow band noise-producing multi-frequency alarm, annotated with dashed-line regions indicating a voltage regulator, a noise source, an active low-pass filter, and an audio amplifier.
Figure 1B:
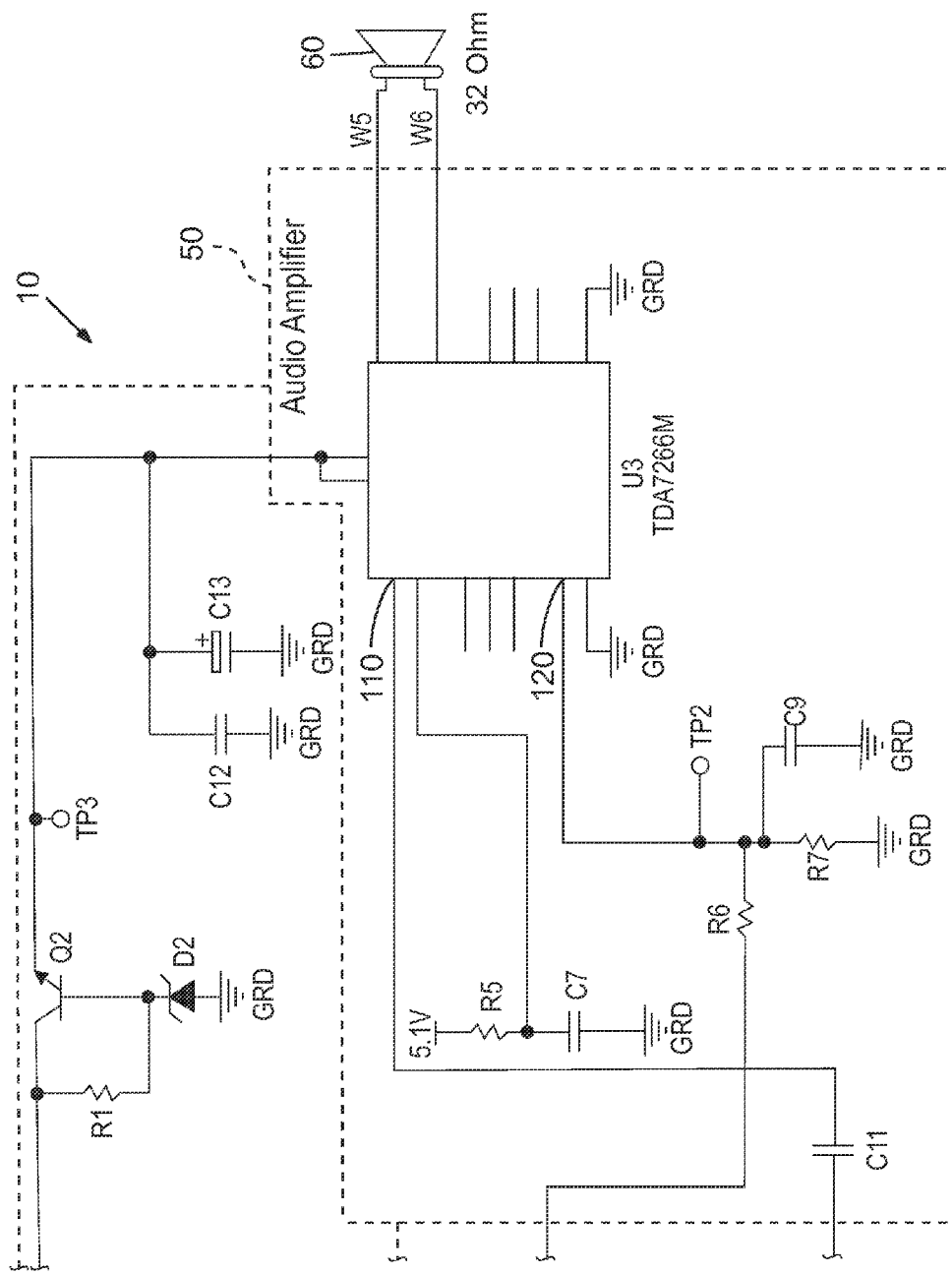

FIGS. 1A and 1B are a schematic diagram of an electrical circuit 10 of an embodiment of the disclosed multi-frequency alarm. Circuit 10 includes a voltage regulator 20, a noise source 30, an active low-pass filter 40, an audio amplifier 50, and an audio speaker 60.

Voltage regulator 20 receives, from a twelve or twenty-four volt vehicle-electrical system (not shown), electrical power applied to one of two pairs of voltage inputs labeled W1, W2, W3, and W4. For example, power may be applied to either the pair of 22 AWG inputs (W1 and W4) or the pair of 16 AWG inputs (W2 and W3). An input filter 25 conditions the applied power to remove spurious noise and converts an input voltage level to a desired DC voltage level that is suitable for powering integrated circuit components described below.

Noise source 30 includes a Peripheral Interface Controller (PIC) microcontroller U1, which is identified by number PIC10F322 and is available from Microchip Technology Inc. of Chandler, Ariz. Microcontroller U1 configured as shown executes firmware instructions to generate contemporaneously a pseudorandom bit stream, a 400 kHz clock signal, and a 1.3 Hz sound pulse rate signal. While it generates the pseudorandom bit stream as an initial noise signal, microcontroller U1 also controls additional features of the alarm. For example, microcontroller U1 provides the 400 kHz clock signal to control a switched-capacitor low-pass filter U2 in active low-pass filter 40, and provides the 1.3 Hz sound pulse rate signal to establish a pulsing sound feature in conjunction with a mono bridge amplifier U3 in audio amplifier 50. Thus, using microcontroller U1 to generate an initial noise signal and to control other functions of the alarm reduces the number of component parts and the hardware footprint.

Figure 2:
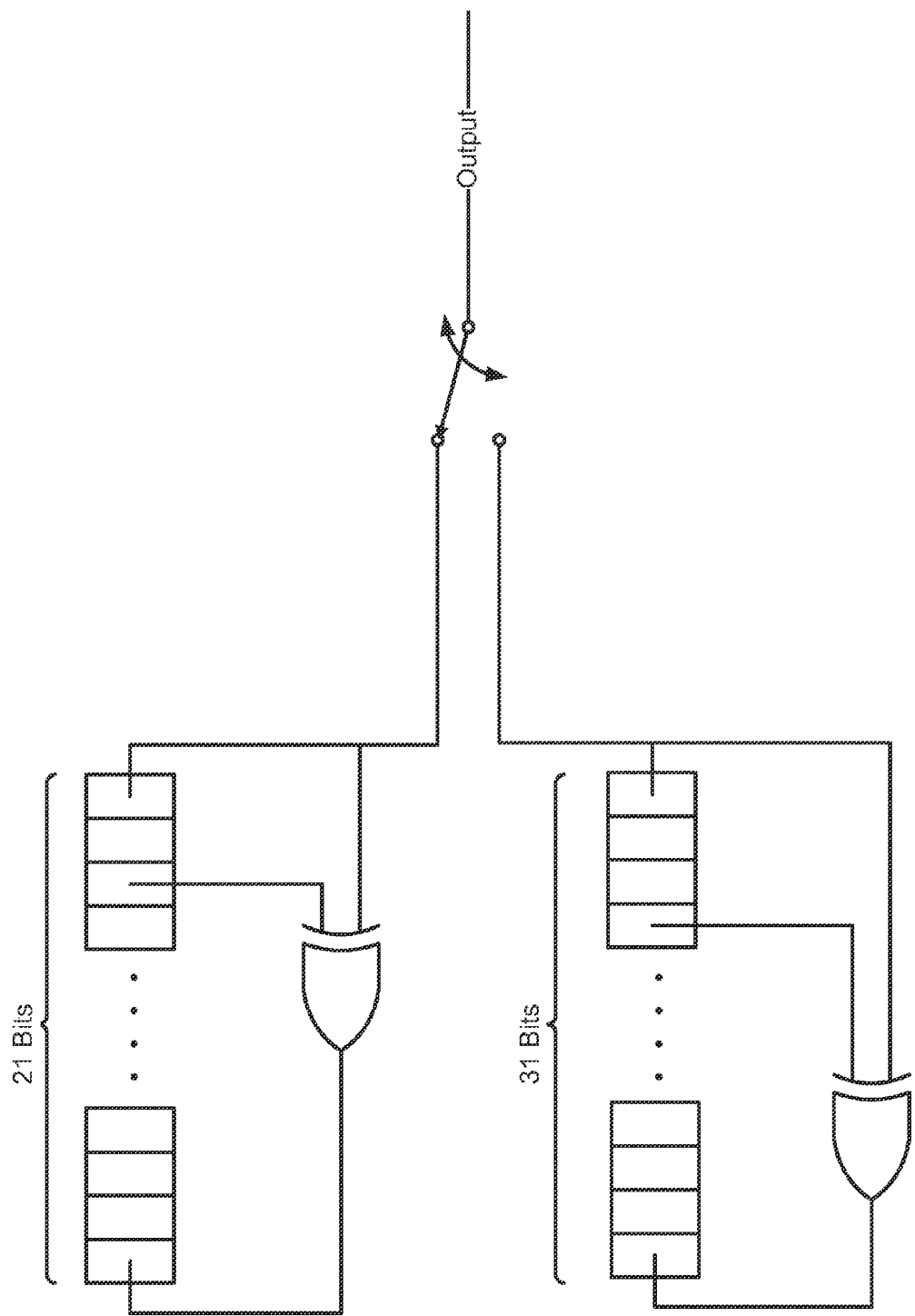
FIG. 2 is a block diagram of a dual linear-feedback shift register (LFSR) pseudorandom bit stream generator.

FIG. 2 shows a block diagram of two LFSRs configured to produce an effective 52-bit long pseudorandom bit stream. Microcontroller U1 is programmed to generate the pseudorandom bit stream at a desired output bit rate, e.g., 7 kHz, in accordance with a dual LFSR algorithm that simulates noise. The dual LFSR algorithm includes instructions that establish, in microcontroller U1, a 21-bit LFSR 62 and a 31-bit LFSR 64. The 21-bit LFSR 62 includes a pair of software-implemented feedback bits at bit positions 19 and 21, and the 31-bit LFSR 64 includes a pair of software-implemented feedback bits at bit positions 28 and 31. Pairs of software-implemented feedback bits are equivalent to feedback "taps" of conventional hardware-implemented LFSRs. As illustrated in FIG. 2, for each LFSR, pairs of feedback bits are applied to different inputs of an exclusive-or logic gate, the output of which is fed back into an input bit position of the corresponding LFSR. As bits of each LFSR are shifted toward its respective output bit position, values of output bits from the LFSRs are alternately sampled to form the pseudorandom bit stream. The alternate sampling between the output bit positions of the two LFSRs is represented by a toggle switch 66 illustrated in FIG. 2. Samples taken alternately from the LFSRs provide an effective LFSR-length of 52 bits. Moreover, since the LFSRs have unequal bit lengths, the resulting pseudorandom bit stream does not repeat until both LFSRs repeat respective cycles concurrently, i.e., after production of sample number $2^{52}$.

The dual LFSR algorithm produces a noise signal exhibiting a multi-frequency spectrum characterized by relatively constant amplitude across the spectrum (i.e., a generally flat, even frequency distribution). Consequently, audible sound derived from the noise signal of the dual LFSR algorithm has a more even frequency distribution compared to that of sound derived from other multi-frequency noise generation techniques (e.g., using a zener diode to produce white noise).

Figure 3:
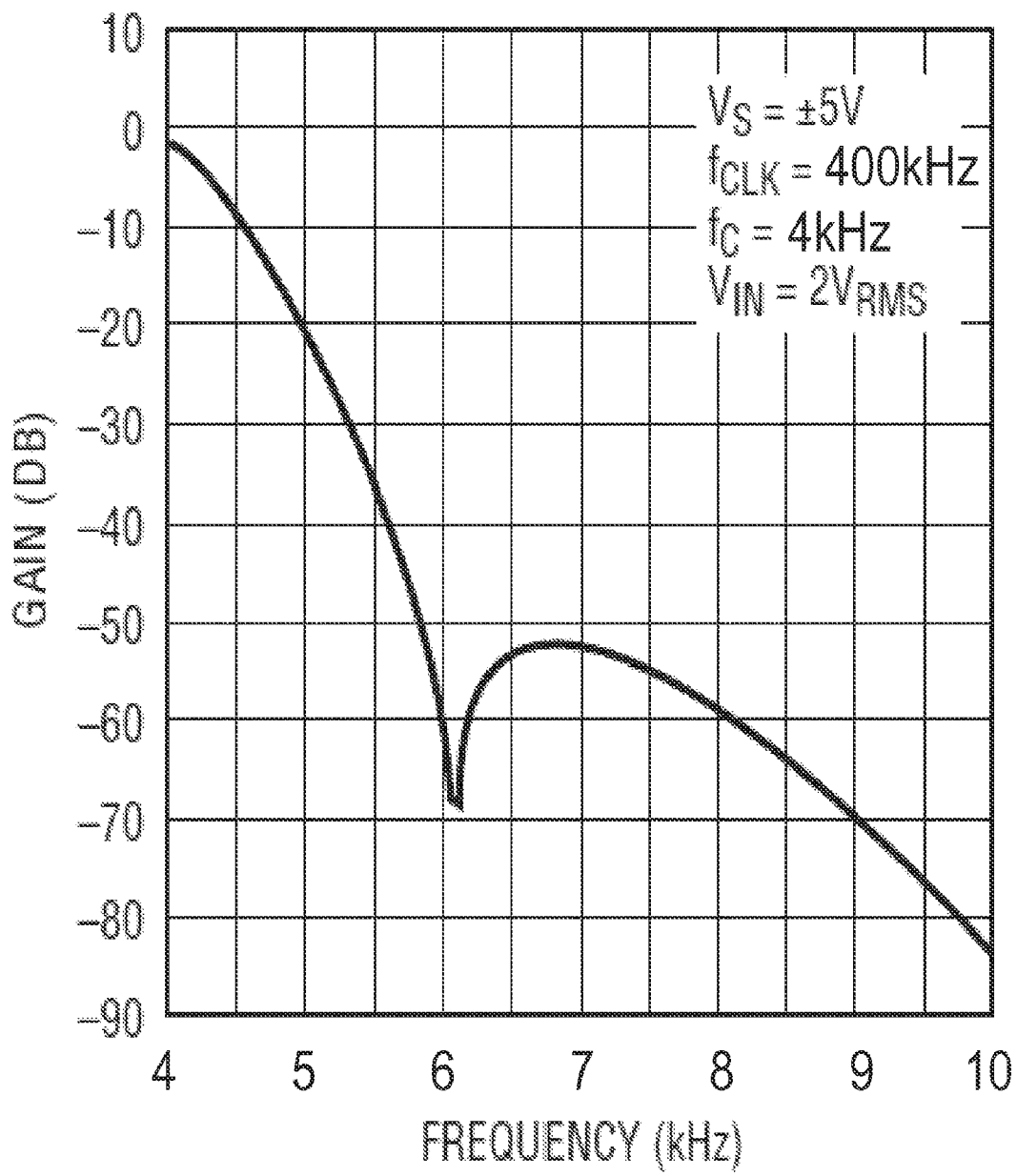
FIG. 3 is a frequency response plot representative of that of the active low-pass filter shown in FIG. 1A.

The pseudorandom bit stream output is provided at a pin 70 of microcontroller U1. The output from pin 70 is voltage-divided by resistors R3 and R4, passively low-pass filtered by a capacitor C5, and subsequently provided to active low-pass filter 40 at a pin 80 on filter U2 of active low-pass filter 40. Filter U2 is identified by part number LTC1069-1, and is referred to as a "Low Power, $8^{th}$ Order Progressive Elliptic, Lowpass Filter," which is available from Linear Technology Corporation of Milpitas, Calif. The cutoff frequency of filter U2 is configurable and is set by a clock signal frequency divided by a factor of one hundred. The 400 kHz clock signal produced by microcontroller U1 is delivered on line 90 to filter U2. For this embodiment, the 4 kHz cutoff frequency of circuit 10 is established as one one-hundredth of the 400 kHz clock frequency generated by programming microcontroller U1. Accordingly, filter U2 receiving the 400 kHz clock signal produces, at its output pin 100, a narrow band noise signal having a high-frequency roll-off at 4 kHz, which appreciably attenuates noise signal frequencies exceeding 4 kHz. FIG. 3 shows for active low-pass filter 40 a frequency response plot representative of a 400 kHz clock frequency $f_{CLK}$ establishing a 4 kHz cutoff frequency $f_C$.

The narrow band noise signal output on pin 100 is capacitively coupled to an input pin 110 of amplifier U3 of audio amplifier 50. Amplifier U3 is identified by number TDA7266M, which is available from STMicroelectronics of Geneva, Switzerland. A gate signal input pin 120 of amplifier U3 receives the 1.3 Hz sound pulse rate signal generated by microcontroller U1. A signal applied to gate signal input pin 120 controls internal circuitry of amplifier U3 that inhibits an input signal delivered to pin 110 from reaching amplification stages of amplifier U3. For this embodiment, the 1.3 Hz sound pulse rate signal is generated by programming microcontroller U1 and delivered from its pin 130 to pin 120 of amplifier U3. Amplifier U3 receives the 1.3 Hz sound pulse rate signal to create intermittent audible output emission from audio speaker 60, thereby gating audible output according to the beep rate signal. In this embodiment, a full cycle of the 1.3 Hz sound pulse rate signal activates and deactivates amplifier U3 for 330 ms and 440 ms, respectively. When active, amplifier U3 amplifies the narrow band noise signal and provides amplified narrow band noise to audio speaker 60 for audible emission of narrow band noise in conjunction with a vehicle driving in reverse to reverse its position.

The magnitude of alarm sound output emitted from audio speaker 60 is generally established by a combination of voltage divider resistors R3 and R4 of noise source 30, the gain (e.g., FIG. 3) provided by filter U2 of active low-pass filter 40, and a zener diode D2 of voltage regulator 20. For example, voltage divider resistors R3 and R4 determine a first voltage level of the noise signal delivered to filter U2 at input pin 80. The gain of filter U2 determines a second voltage level at output pin 100 that is in electrical communication with input pin 110 on amplifier U3. Zener diode D2 determines the maximum output voltage of amplifier U3.

Figure 4:
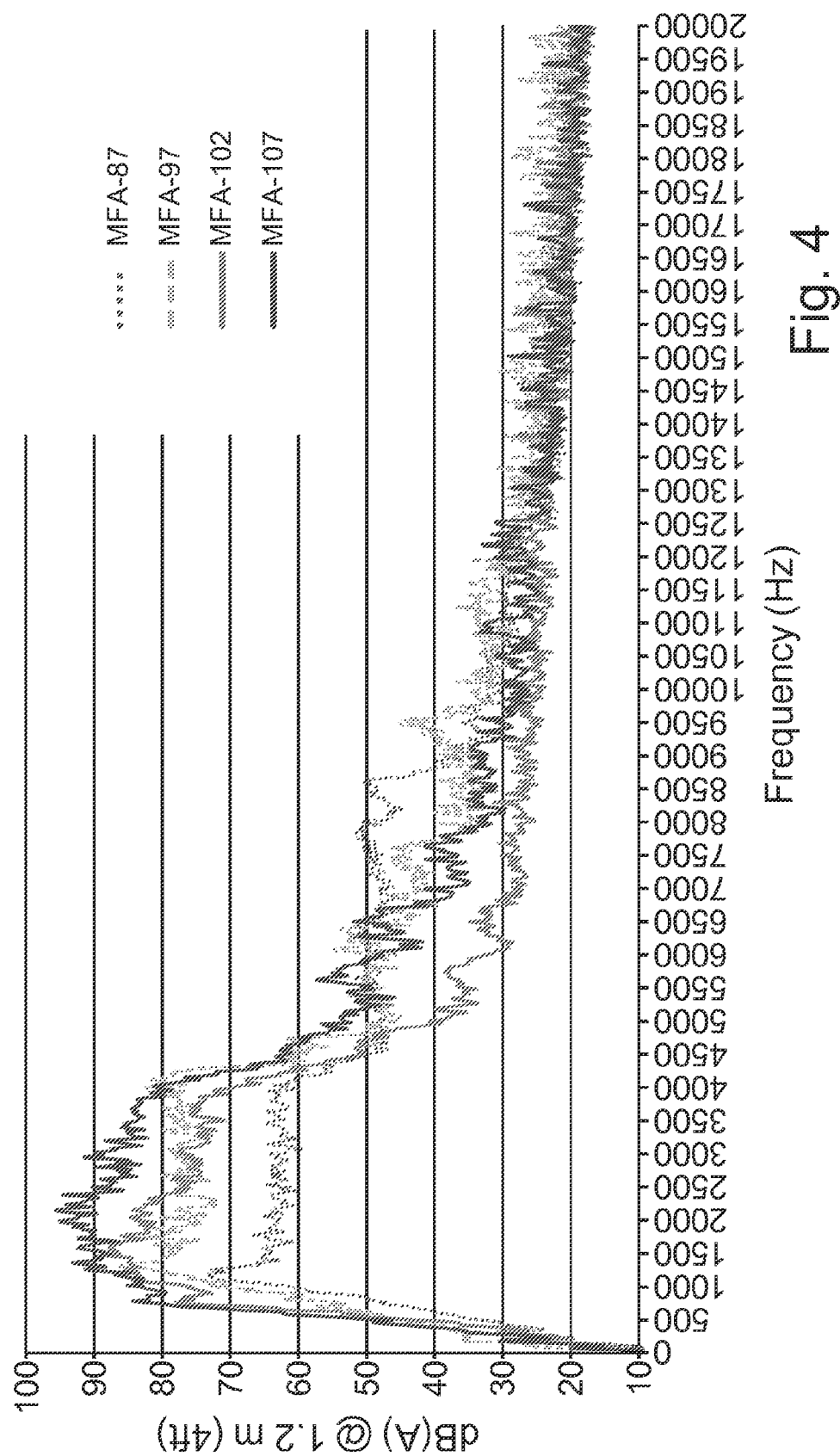
FIG. 4 shows, for four implementations (MFA-87, -97, -102, and -107) of the multi-frequency alarm embodiment of FIGS. 1A and 1B, linear-frequency response graphs representing four sound magnitude characteristics of narrow band noise emitted from an audio speaker of the multi-frequency alarm.

The avalanche voltage of zener diode D2 and values of resistors R3 and R4 may be selected based on a desired sound magnitude. For example, FIG. 4 shows, for this embodiment implemented with four different electrical-component configurations of zener diode D2 and resistors R3 and R4, linear-frequency response graphs representing four sound magnitude characteristics of narrow band noise emitted from 0 Hz to 20 kHz by audio speaker 60 of the alarm. The four sound magnitude characteristics are represented by different line styles labeled as MFA-87, MFA-97, MFA-102 and MFA-107. The numeric portions of these labels connote total output power emitted from audio speaker 60 in the audible frequency range, i.e., the sum of the energy in the peaks across the frequency range of interest. Although each electrical component configuration provides similar audible bandwidth of the narrow band noise, the sound magnitudes vary according to D2, R3, and R4 component values.

In any electrical component configuration, however, because of removal of higher frequencies, the narrow band noise provides, for given SPLs, an alarm sound that is less shrill and abates over shorter distances, as compared to other alarm sounds. In general, sound emitted from a back-up alarm attenuates according to the inverse square law, but the rate of attenuation is also dependent on the frequency of the sound. Higher frequency sounds attenuate more rapidly (over shorter distances) than do lower frequency sounds. This phenomenon becomes noticeable at transmission distances exceeding approximately 100 feet (30.5 meters), such as in typical environments where back-up alarms are employed.

Figure 5:
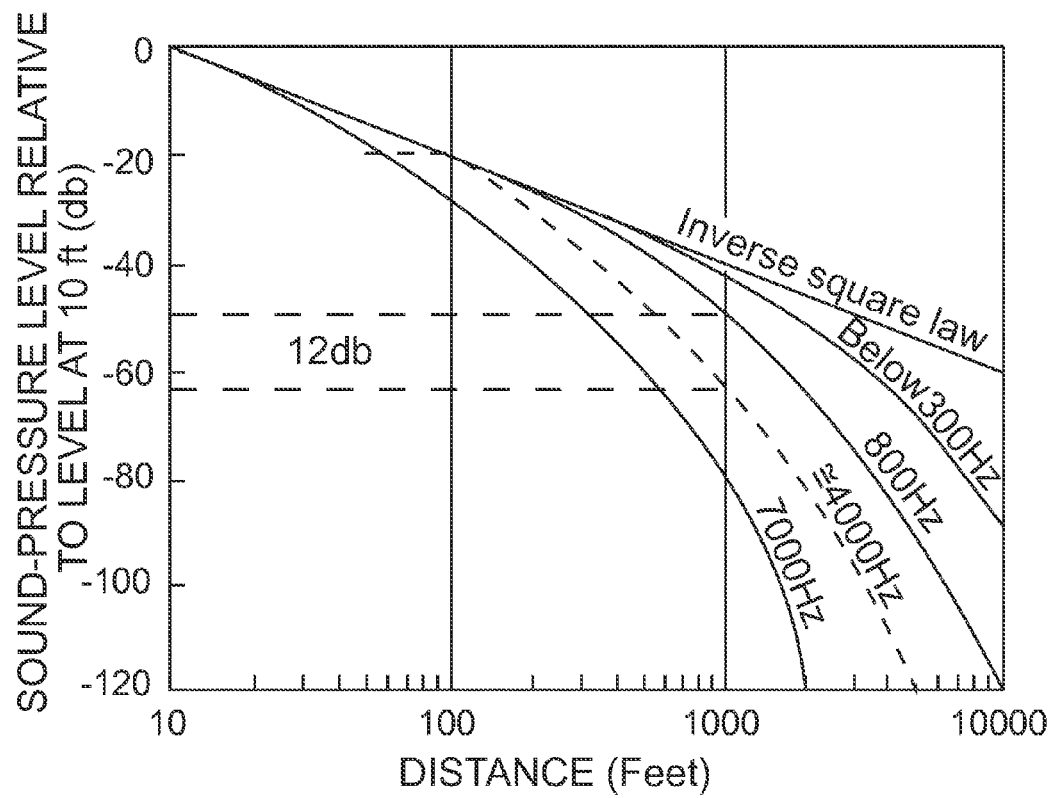
FIG. 5 is a graph showing sound pressure level (SPL) attenuation as a function of transmission distance for various frequencies of sound.

For example, as shown in FIG. 5, for a transmission distance of 100 feet (30.5 meters), SPL attenuation generally follows the inverse square law for sound having frequencies at or below 4 kHz, i.e., the SPL attenuation attributable to transmission distance is generally unnoticeable at this distance. Conversely, for a transmission distance of approximately 1,000 feet (305 meters), sound having a frequency of 4 kHz is attenuated by approximately 12 dB more than a sound having a frequency of 800 Hz. This 800 Hz-4 kHz bandwidth includes the audible frequency range of the multi-frequency alarm (i.e., approximately 800 Hz-4 kHz, FIG. 4). The multi-frequency alarm is significantly quieter than a pure tone alarm at a transmission distance of 1,000 feet (305 meters). Thus, narrow band noise is eco-friendly in that it facilitates compliance with residential noise-loudness restrictions and reduces complaints from residents in areas near a work area where a multi-frequency alarm is employed.

The Society of Automotive Engineers (SAE) established a Surface Vehicle Standard entitled "Alarm—Backup—Electric Laboratory Performance Testing," also known as SAE J994. The standard states: "The predominant sound frequency of the alarm shall be defined as the frequency that produces the highest A-weighted sound pressure level. The acceptable frequency range is 700 to 2800 Hz." The implementations of the embodiment of the disclosed multi-frequency alarm satisfy the SAE standard and produce sound that contains ail frequencies within the acceptable frequency range of SAE J994.

According to equal loudness contours of ISO 226:2003, for a given SPL, the audible frequency range emitted from audio speaker 60 corresponds to a frequency range that is perceived by human beings as subjectively louder than higher-frequency sounds. Consequently, narrow band noise emitted from the multi-frequency alarm may still be perceived as being as loud as or louder than higher frequencies emitted with greater SPLs.

A masking noise is a noise that interferes with (i.e., masks) a person's ability to discern an alarm sound. A critical band corresponds to a band of audio frequencies within which a second tone will interfere with the perception of a first tone by auditory masking. A critical bandwidth is defined as the bandwidth at which increasing the bandwidth of a masking noise has little or no influence on the amount of masking produced on a tone at the center of a critical band. In other words, if alarm and masking sounds having frequencies in a critical band are simultaneously presented to a person, masking sound frequencies within the critical bandwidth contribute to masking of the alarm sound. The multi-frequency alarm of the present disclosure emits sound encompassing multiple critical bands, which decreases the likelihood that environmental noise masks the warning sound of the alarm. For example, the following Table 1, reproduced from Appendix E of the "Handbook for Acoustic Ecology," (Barry Truax, ed., Simon Fraser University and ARC Publications 2nd ed. 1999) shows that embodiments of the multi-frequency alarm encompass approximately eleven critical bands in the frequency range from 800 Hz to 4 kHz.

TABLE 1

Examples of Critical Bands

| Critical Band Number | Critical Band Center Frequency (Hz) | Critical Bandwidth (Hz) | Critical Band Lower Cutoff Frequency (Hz) | Critical Band Upper Cutoff Frequency (Hz) |
|---|---|---|---|---|
| 1 | 50 | — | — | 100 |
| 2 | 150 | 100 | 100 | 200 |
| 3 | 250 | 100 | 200 | 300 |
| 4 | 350 | 100 | 300 | 400 |
| 5 | 450 | 110 | 400 | 510 |
| 6 | 570 | 120 | 510 | 630 |
| 7 | 700 | 140 | 630 | 770 |
| 8 | 840 | 150 | 770 | 920 |
| 9 | 1000 | 160 | 920 | 1080 |
| 10 | 1170 | 190 | 1080 | 1270 |
| 11 | 1370 | 210 | 1270 | 1480 |
| 12 | 1600 | 240 | 1480 | 1720 |
| 13 | 1850 | 280 | 1720 | 2000 |
| 14 | 2150 | 320 | 2000 | 2320 |
| 15 | 2500 | 380 | 2320 | 2700 |
| 16 | 2900 | 450 | 2700 | 3150 |
| 17 | 3400 | 550 | 3150 | 3700 |
| 18 | 4000 | 700 | 3700 | 4400 |
| 19 | 4800 | 900 | 4400 | 5300 |
| 20 | 5800 | 1100 | 5300 | 6400 |
| 21 | 7000 | 1300 | 6400 | 7700 |
| 22 | 8500 | 1800 | 7700 | 9500 |
| 23 | 10500 | 2500 | 9500 | 12000 |
| 24 | 13500 | 3500 | 12000 | 15500 |

Suppressing frequencies above 4 kHz does not have a significant deleterious effect on a person's ability to hear the emitted sound. Indeed, those frequencies are not audible by all people—only a subset of the human population can hear frequencies above 4 kHz due to various forms of hearing loss. For example, forms of hearing loss include noise-induced threshold shift (NITS), age-related, and noise-related hearing loss.

NITS hearing loss is characterized by a significant hearing threshold loss at 3 kHz, 4 kHz, or 6 kHz. That is, threshold-hearing values at 3, 4, or 6 kHz are at least 15 dB worse than the threshold values between 500 Hz and 1 kHz. This affects approximately 5.2 million people in the U.S. between ages 6 and 19 years.

Age-related hearing loss is characterized by a person's hearing worsening progressively as a function of his or her age—particularly for frequencies above 2 kHz. A recent study performed for the U.S. Department of Transportation showed approximately 10% of the total population is 65 years of age or older and a similar percentage of all pedestrian accident victims are among this age group. However, over 18% of the vehicle back-up related accident victims are 65 or older. Therefore, age appears to be a unique added risk factor in vehicle back-up related accidents.

Noise-related hearing loss affects a person's ability to hear higher frequencies. In general, the severity of loss increases as the frequency increases, beginning at a little more than 1 kHz, becoming continuously more severe to 4 kHz, and remaining severe at frequencies above 4 kHz. Severity for particular frequencies depends upon the duration of noise exposure (e.g., years of prolonged noise exposure).

Hearing loss, whether noise- or age-related, is significantly more severe for higher frequencies. That is, hearing loss for frequencies above 2 kHz is typically more severe than that for frequencies of 1 kHz; hearing loss at 3 kHz is worse than that of 2 kHz, hearing loss at 4 kHz is worse than that of 3 kHz, and so on. By encompassing multiple frequencies in these ranges—particularly at the lower frequencies—the multi-frequency alarm mitigates the risk of someone with hearing loss not hearing the narrow band back-up alarm warning sound. Additionally, using a band of sound as opposed to a tonal sound means that even people with hearing impairments and limited abilities to detect some frequencies will still likely be able to hear at least some of the narrow band noise emitted from audio speaker 60. For example, even if a person had an inability to hear frequencies clustered around 2 kHz (e.g., rows 13 and 14 of Table 1), that person could still hear the multi-frequency alarm based on the remaining audible spectrum (e.g., rows 8-12, and 15-18).

Suppressing frequencies above 4 kHz also reduces the power consumption of the multi-frequency alarm hardware. Further, because the multi-frequency alarm emits a relatively narrow range of frequencies, a less expensive audio speaker may be used to emit the audible range of sound. For example, a loudspeaker that matches a narrow frequency band is generally less expensive and easier to build and maintain than a high-fidelity loudspeaker capable of emitting a wider range of frequencies. For example, FIG. 6 shows a comparison between frequency responses of a conventional stereo system audio tweeter and audio speaker 60 of MFA-107. Despite the two audio speakers having similar speaker cone diameters, tweeter SPL output increases at frequencies beyond 4 kHz, whereas audio speaker 60 SPL output peaks in the acceptable frequency range of SAE J994 (e.g., around 2 kHz) and is less than that of the tweeter at frequencies exceeding about 4 kHz.

It will be understood by skilled persons that many changes may be made to the details of the above-described embodiments without departing from the underlying principles of the invention. For example, various active filters may be used in conjunction with various noise sources. The scope of the present invention should, therefore, be determined only by the following claims.

The invention claimed is:

1. A multi-frequency alarm to generate a narrow band noise warning of a presence of a vehicle, comprising:
    noise signal circuitry generating a pseudorandom bit stream at an output bit rate and bit length to produce a noise signal that exhibits a multi-frequency spectrum;

an active low-pass filter receiving the noise signal and producing a narrow band noise signal, the active low-pass filter configured to establish for the narrow band noise signal spectral characteristics exhibiting, at about 4 kHz, a high-frequency noise signal magnitude roll-off that attenuates frequencies greater than 4 kHz;

an audio amplifier producing an amplified narrow band noise signal corresponding to the narrow band noise signal; and an audio speaker responsive to the amplified narrow band noise signal and configured to emit narrow band noise sound derived from the narrow band noise signal.

2. The multi-frequency alarm of claim 1, in which the noise signal circuitry comprises a microcontroller programmed to generate the pseudorandom bit stream.

3. The multi-frequency alarm of claim 2, in which the pseudorandom bit stream is generated by implementation of a linear-feedback shift register pseudorandom algorithm.

4. The multi-frequency alarm of claim 3, in which the implementation of a linear-feedback shift register pseudorandom algorithm includes two linear-feedback shift registers, each of which having software-implemented feedback bits and an output bit position, and entails alternate sampling between values of the output bit positions of the two linear-feedback shift registers.

5. The multi-frequency alarm of claim 1, in which the noise signal circuitry provides a clock signal at a clock output frequency, and in which the active low-pass filter is digitally implemented and has a cutoff frequency that corresponds to the clock signal output frequency and establishes the high-frequency that corresponds to a clock signal output frequency and establishes the high-frequency noise signal magnitude roll-off.

6. The multi-frequency alarm of claim 1, in which the audio speaker is responsive to the amplified narrow band noise signal by emitting the narrow band noise sound exhibiting noise sound spectral characteristics derived from the spectral characteristics of the narrow band noise signal.

7. The multi-frequency alarm of claim 6, in which the noise sound spectral characteristics further attenuate frequencies exceeding 4 kHz.

8. The multi-frequency alarm of claim 1 further comprising a voltage regulator.

9. The multi-frequency alarm of claim 1, in which the multi-frequency spectrum is characterized by a generally flat, even frequency distribution.

10. The multi-frequency alarm of claim 1, in which the noise signal circuitry comprises a microcontroller programmed to generate contemporaneously the pseudorandom bit stream, a clock signal to control the production of the narrow band noise signal by the active low-pass filter, and a sound pulse rate signal to establish a pulsing sound feature for the emitted narrow band noise sound.

\* \* \* \* \*